United States Patent [19]

Tsai

[11] Patent Number: 5,693,937
[45] Date of Patent: Dec. 2, 1997

[54] IMAGE INFORMATION READING APPARATUS WITH AN INTERNAL DOCUMENT TRAY

[75] Inventor: Jenn-Tsair Tsai, Tao-Yuan, Taiwan

[73] Assignee: Must Systems, Inc., Hsinchu, Taiwan

[21] Appl. No.: 639,600

[22] Filed: Apr. 29, 1996

[51] Int. Cl.[6] ........................................ H01J 3/14
[52] U.S. Cl. .................... 250/234; 250/208.1; 358/475
[58] Field of Search ............................ 250/234, 208.1, 250/216; 358/474, 475, 487

[56] References Cited

U.S. PATENT DOCUMENTS 5,455,412  10/1995  Imagawa et al. ................. 250/234
5,585,627  12/1996  Akutsu et al. .................... 250/234

*Primary Examiner*—Que Le
*Attorney, Agent, or Firm*—Harness, Dickey & Pierce, P.L.C.

[57] ABSTRACT

The invention discloses a compact scanner with an internal document tray which can be integrated with a computer and adapted to the location of the floppy diskette driver of the computer. The invention has a very simple structure driving device which allows a document I/O device to locate between illuminating device and photoelectric converting unit. When scanning, an illuminating unit provides light source for the reflective sheet placed on the internal document I/O device. The reflection is then guided to photoelectric converting unit to be converted into electric signals for the computer to read.

14 Claims, 4 Drawing Sheets

IMAGE INFORMATION READING APPARATUS WITH AN INTERNAL DOCUMENT TRAY

BACKGROUND OF THE INVENTION

A. Field of the Invention

The present invention relates to an image information reading apparatus, especially to an image information reading apparatus having an internal document tray which can be adapted to the location of a floppy diskette driver of a personal computer.

B. Description of the Prior Art

Most scanners available on the market are external. Refer to FIG. 1 which shows the outlook of a conventional scanner. Scanner is housed in housing 101. On top of the housing 101 there is a glass plate 102 for supporting an original sheet. Above the glass plate 102 there is a plastic cover 103. The plastic cover 103 may simply be a cover to shut light off the sheet. It may also contain a light source for emitting transmitted light.

A scanner relies on various driving mechanisms to maintain a stable and fixed light path, thereby to generate high quality images. Accordingly, the driving mechanisms of a scanner can be roughly classified as simple and complex. FIG. 2 shows a scanner inside a housing with a simple-structure driving device. The driving mechanism as shown in FIG. 2 is simple because all the optical elements for reading information off the original sheets are installed in the same carriage 202, including a straight-tube fluorescent lamp 203, an array of mirrors 206, 204, 205, and a CCD line image sensor 207. When the image of a sheet is being scanned, the simple driving mechanism drives only carriage 202 mounted on support device 211 back and forth while the positions of the elements inside carriage 202 remain unchanged. When scanning, a sheet is placed on a glass table 201 which is at the top of the housing 101. An exposure light beam emitted from straight-tube fluorescent lamp 203 is shone onto the sheet and then reflected by the sheet. The array of mirrors 206, 204, 205 guides the light beam to a CCD line image sensor 207 which converts the light beam into an electrical signal.

A scanner with a complex-structure driving mechanism is shown in FIG. 3. FIG. 3 shows a perspective view of a scanner inside a housing. The driving mechanism is complex because it requires two driving devices, one for the light source unit 302, the other for the arrays of mirrors. Light source unit 302 includes a straight-tube fluorescent lamp 305 and a mirror 304. Other mirrors are fixed on optical member holder 301 for guiding a light beam to a linear image sensor 303 which is fixed on the housing. When scanning, a sheet is placed on glass table on top of the housing and driving device moves light source unit 302 in Y distance while optical member holder 301 follows in ½ Y distance to keep the same light path. The complex driving mechanism can reduce the size of a scanner. However, its structure is very complex and difficult to assemble. It will inevitably raise the manufacturing cost of the apparatus. Moreover, since light source unit 302 and optical member holder 301 are both moving while scanning images, it is more likely to increase the light deflection or color deflection of reflective images.

Following the driving mechanisms described above, it is difficult to implement an internal document tray inside a conventional scanner because there is no room between an illuminating unit and a photoelectric converting unit. It is even more difficult for a conventional external scanner to be adapted to the location of a floppy diskette driver of a personal computer.

SUMMARY OF THE INVENTION

It is therefore the primary goal of the present invention to provide an image information reading apparatus having an internal document tray disposed between an illuminating unit and a photoelectric converting unit.

It is another object of the invention to provide a compact scanner which can be adapted to the location of a floppy diskette driver of a computer.

It is still another object of the invention to provide a simple-structure scanner so as to save the manufacturing cost of a scanner.

These and other objects of the invention, which will become more apparent as the invention is described more fully below, are obtained by providing a compact image information reading apparatus with an internal document tray. The image information reading apparatus includes at least an illuminating unit, a photoelectric convening unit, a driving device, and an internal document I/O device. The internal document I/O device is disposed between the illuminating unit and the photoelectric converting unit. The illuminating unit emits a light beam shone onto the original sheet. The reflection is then guided to the photoelectric convening unit via an array of mirrors. The movement of the illuminating unit and the photoelectric converting unit is controlled by a driving device. The driving device includes the conveyor belt in a shape of a single closed loop and multiple rotating devices. Based on this simple-structure driving device, the invention can be so compact that it can be adapted to the location of a floppy diskette driver of a computer.

DETAILED DESCRIPTION OF THE PREFERRED EMBODIMENTS

To build an internal document tray inside the housing, the structure of the driving device in a conventional scanner must be simplified. With this change, the outlook of the invention is very similar to a CD-ROM device driver which consists of a compact housing and an internal document tray in the middle.

Figure 1:
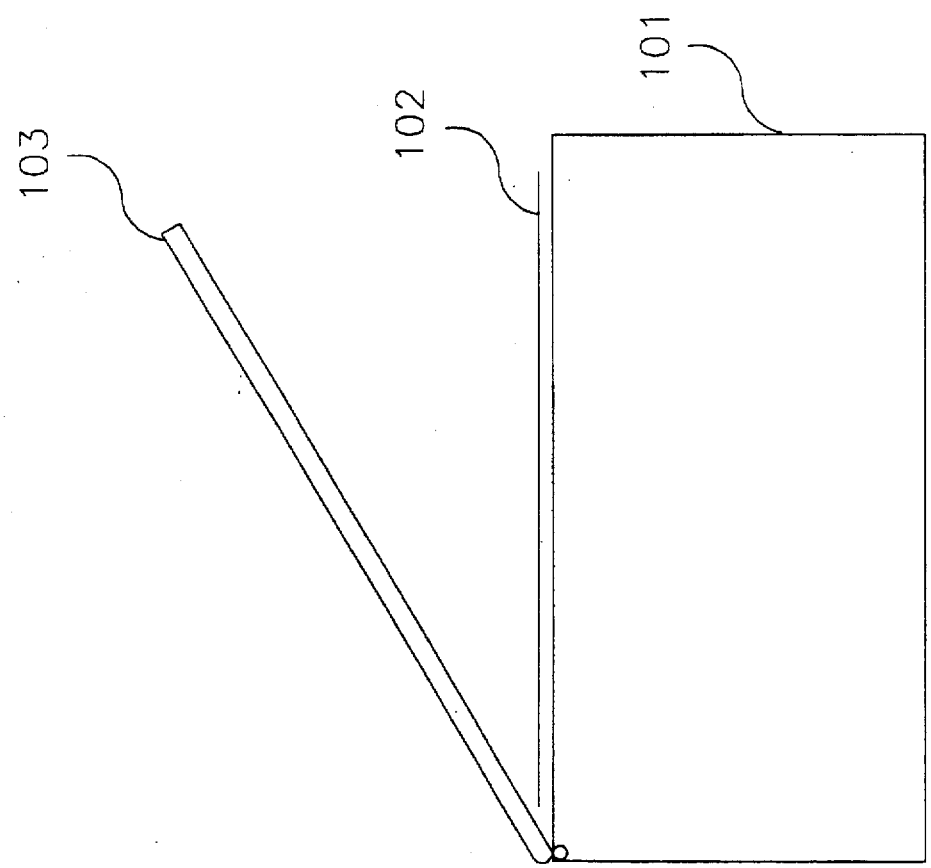
FIG. 1 is a schematic diagram showing the outlook of a conventional scanner.
Figure 2:
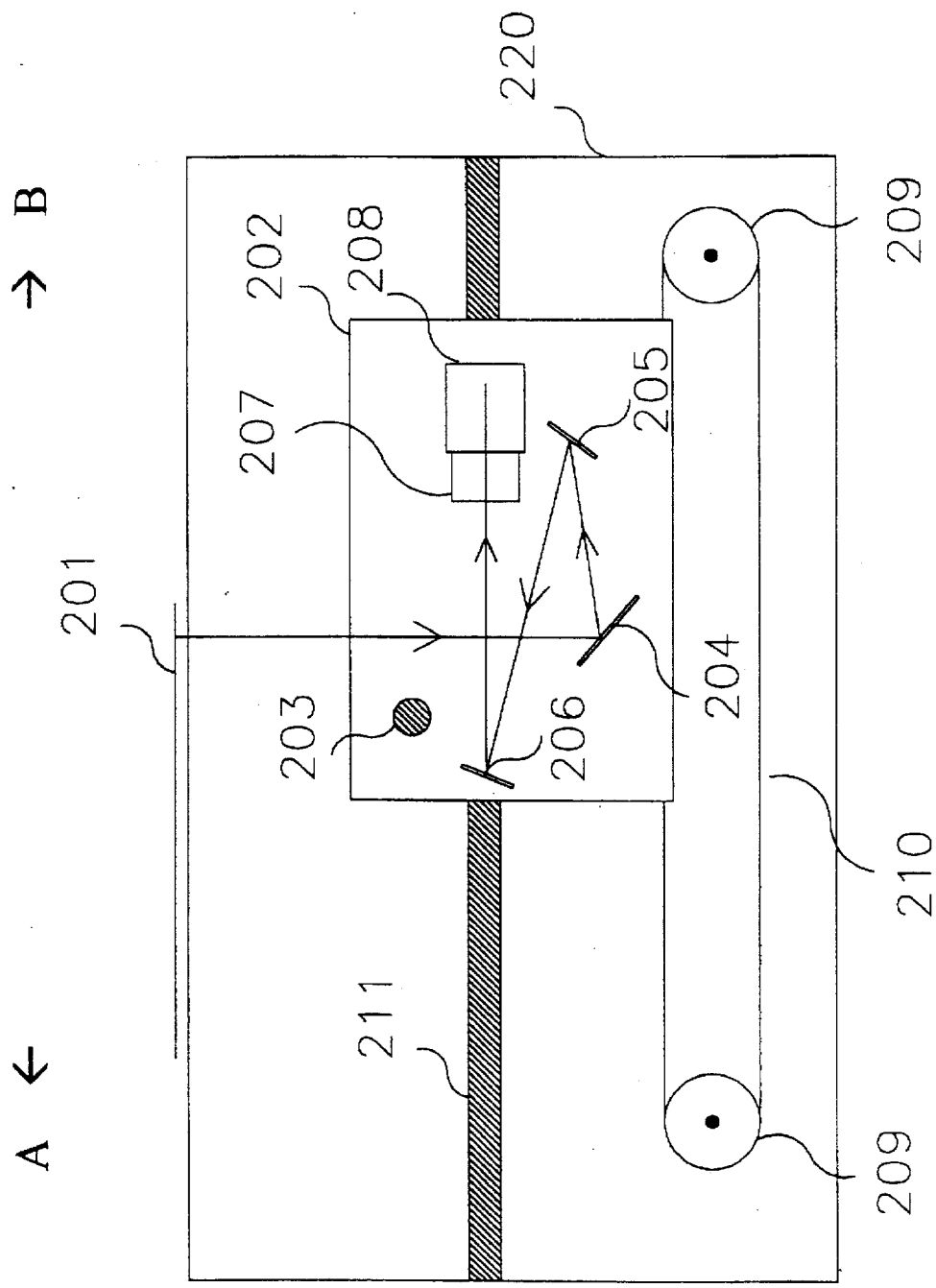
FIG. 2 is a perspective side view showing a scanner with a simple structure driving device.
Figure 3:
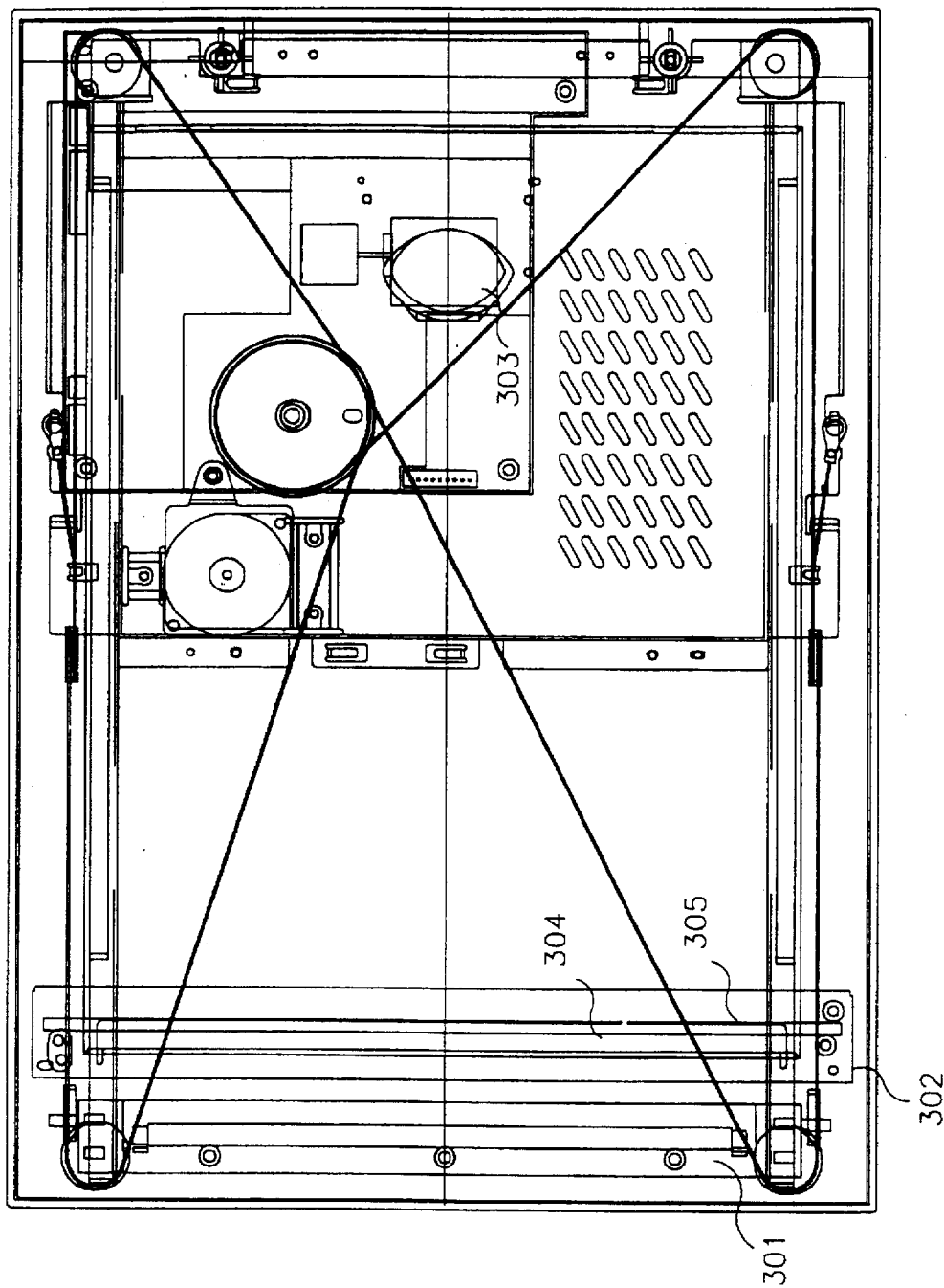
FIG. 3 is a perspective side view showing a scanner with a complex structure driving device.
Figure 4:
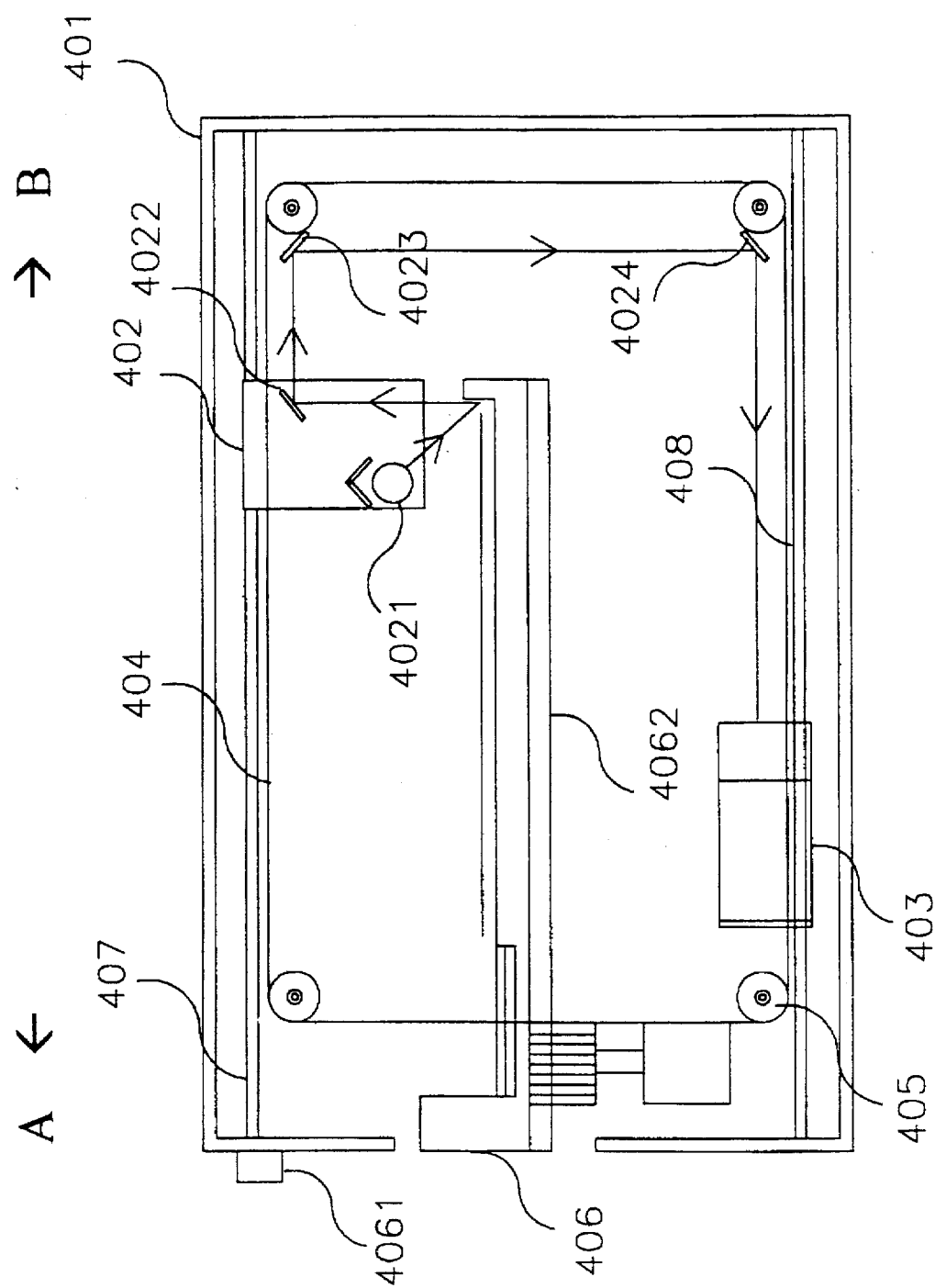
FIG. 4 is a perspective side view showing the preferred embodiment of the invention.

Referring to FIG. 4, the invention includes illuminating unit 402, photoelectric converting unit 403, conveying device 404, rotating device 405 and internal document I/O device 406. Illuminating device 401 and photoelectric converting unit 403 are mounted on support device 407,408 respectively. Support device 407 and 408 are slide shaft or hinge shaft for illuminating unit 401 and photoelectric converting unit 403 to easily slide in the longitudinal direction of the housing. The movement of illuminating unit 401 and photoelectric converting unit 403 is controlled by driving device which includes rotating devices 405 and conveying device 404. The rotating devices 405 are located inside the housing and are driven by a motor (not shown). The rotating devices 405 are connected by a conveying device 404 in a shape of a single closed loop. A conveying device 404 is a conveyor belt or a steel wire rope. When the motor is energized, it drives the rotating devices 405 which further drives conveying device 404. Since the shape of conveying device 404 is in a shape of a closed loop, so the movement of conveying device 404 will move illuminating unit 402 and photoelectric converting unit 403 in synchronism, at the same speed and in different directions.

Since the structure of the driving device is simplified, the space between illuminating device 402 and photoelectric converting unit 403 allows the capacity for an internal document I/O device 406. The function of internal document I/O device 406 is similar to that of the document tray of a CD-ROM device driver which provide information for the device to read. The invention can read reflective sheets, such as photos or name cards. Internal document I/O device 406 includes controller 4061 and document tray 4062. Document tray 4062 disposed between illuminating unit 402 and photoelectric convening unit 403 supports reflective sheets. It operates in response to the operations of controller 4061. Controller 4061 is like a push button which locates on the surface of the compact housing 401 to operate the movement of the document tray 4062.

Illuminating device 402 includes a lamp 4021 for emitting a light beam shone onto the surface of the reflective sheets. The image reflection is guided to photoelectric converting unit 403 via an array of optical members, such as mirrors. The image reflection is first reflected to first mirror 4022 in illuminating device 402. The image reflection is further guided to photoelectric converting unit 403 via mirror 4023 and 4024. Mirror 4023 and 4024 are fixed inside the housing 401. Photoelectric converting unit 403 is implemented as a line image sensor, such as CCD line image sensor or a CIS line image sensor, for converting image reflections into electric signals for the computer to read.

When scanning, first push the controller 4061 on the surface of the housing 401. Document I/O device 406 operates in response to the control of controller 4061 and moves document tray 4062 out from housing 401 for placing a reflective sheet. When ready, push controller 4062 again to roll document tray 4062 back to the housing 401. Then, the motor (not shown) is energized to drive rotating device 405 which further drive conveying device 404. The movement of conveying device 402 moves illuminating device 402 from position A to position B and photoelectric converting unit 403 from position B to position A in synchronism and at the same speed. During this movement, the illuminating unit 402 has exposed the entire reflective sheet. The image reflection has sent to photoelectric converting unit 403 via an array of mirrors. During the scanning procedure, the light path remains unchanged when illuminating device 402 and photoelectric converting unit 403 are moving. The photoelectric converting unit 403 will convert the image reflection into electric signals for a computer program to read.

FIG. 4 illustrates, the structure of the invention is very simple. Since the structure of the driving device has been simplified, it creates room for the document I/O device sitting between illuminating unit and photoelectric converting unit. Since the structure of the invention is so simple, it can be easily assembled. The manufacturing cost of the apparatus can also be reduced. More importantly, the size of the apparatus can be reduced to 5.25 inches and adapted to the location of the floppy diskette driver of a computer.

It should be understood that various alternatives to the structures described herein may be employed in practicing the present invention. It is intended that the following claims define the invention and that the structure within the scope of these claims and their equivalents be covered thereby.

What is claimed is:

1. An image information reading apparatus for converting image information into digitized information comprising:
   document I/O means disposed internally for supporting an original sheet;
   illuminating means disposed above said document I/O means and mounted on first support means extending in a first direction parallel to the surface of said original sheet for emitting a light beam shone on said original sheet;
   photoelectric converting means disposed below said document I/O means and mounted on second support means extending in a second direction for converting said light beam into electric signals; and
   driving means for moving said illuminating means in said first direction and said photoelectric converting means in said second direction in synchronism and at the same speed.

2. The apparatus as claimed in claim 1 further comprising:
   a compact housing which can be adapted to the location of a floppy diskette driver of a personal computer.

3. The apparatus as claimed in claim 1, wherein said illuminating means comprises a light source which linearly illuminates a portion of said original sheet.

4. The apparatus as claimed in claim 1, wherein said illuminating means further comprises:
   a plurality of optical members for guiding said light beam to said photoelectric converting means.

5. The apparatus as claimed in claim 1, wherein said photoelectric converting means comprises a CCD line image sensor.

6. The apparatus as claimed in claim 1, wherein said photoelectric converting means comprises a CIS line image sensor.

7. The apparatus as claimed in claim 1, wherein said driving means comprises:
   a plurality of rotating means locating inside said compact housing for being driven by motors;
   conveying means connecting to said rotating means in a shape of a single closed loop for moving said illuminating means in said first direction and said photoelectric converting means in said second direction in synchronism and at the same speed.

8. The apparatus as claimed in claim 7, wherein said conveying means is a conveyor belt or a steel wire rope.

9. The apparatus as claimed in claim 1, wherein said document I/O means comprises:
   a controller on the front surface of said compact housing for controlling the input and output of said original sheet; and
   a document tray located inside said compact housing and disposed between said illuminating means and said photoelectric converting means for supporting said original sheet.

10. An apparatus for reading information from a reflective sheet having at least illuminating means and photoelectric converting means, comprising:
    internal document I/O means disposed between said illuminating means and said photoelectric converting means for supporting said reflective sheet;
    a plurality of rotating means for being driven by a plurality of motors; and
    conveying means connecting to said rotating means for moving said illuminating means in a first direction and said photoelectric converting means in a second direction in synchronism and at the same speed.

11. The apparatus as claimed in claim 10 further comprising:

a compact housing which can be adapted to the location of a floppy diskette driver of a personal computer.

12. The apparatus as claimed in claim 10 further comprising:

a plurality of optical members for guiding a light beam emitted from said illuminating means to said photoelectric converting means.

13. The apparatus as claimed in claim 10, wherein said conveying means is a conveyor belt or a steel wire rope in a shape of a single closed loop.

14. The apparatus as claimed in claim 10, wherein said internal document I/O means comprises:

a controller on the front surface of said compact housing for controlling the input and output of said reflective sheet; and a document tray located inside said compact housing and disposed between said illuminating means and said photoelectric converting means for supporting said reflective sheet.

* * * * *